(12) United States Patent
Deliwala

(10) Patent No.: US 10,830,693 B2
(45) Date of Patent: Nov. 10, 2020

(54) COMPACT OPTICAL GAS DETECTION SYSTEM AND APPARATUS

(71) Applicant: Analog Devices, Inc., Norwood, MA (US)

(72) Inventor: Shrenik Deliwala, Andover, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 15/993,188

(22) Filed: May 30, 2018

(65) Prior Publication Data

US 2018/0348121 A1 Dec. 6, 2018

Related U.S. Application Data

(60) Provisional application No. 62/512,407, filed on May 30, 2017.

(51) Int. Cl.
*G01N 21/61* (2006.01)
*G01N 21/3504* (2014.01)
*G01N 21/01* (2006.01)

(52) U.S. Cl.
CPC ......... *G01N 21/3504* (2013.01); *G01N 21/01* (2013.01); *G01N 21/61* (2013.01); *G01N 2021/3513* (2013.01); *G01N 2201/0221* (2013.01); *G01N 2201/0624* (2013.01); *G01N 2201/0637* (2013.01); *G01N 2201/1211* (2013.01)

(58) Field of Classification Search
CPC .......... H04N 5/30; H04N 5/33; G01T 1/1606; H01L 39/10; Y10S 505/00
See application file for complete search history.

(56) References Cited

U.S. PATENT DOCUMENTS

| | | | |
|---|---|---|---|
| 5,973,326 A | 10/1999 | Parry et al. | |
| 6,194,735 B1 * | 2/2001 | Martin | G01N 21/031 250/222.2 |
| 2007/0221848 A1 * | 9/2007 | Johnson | G01J 3/02 250/339.02 |
| 2008/0316489 A1 * | 12/2008 | Ludwig | G01N 21/0303 356/437 |

(Continued)

OTHER PUBLICATIONS

International Search Report and Written Opinion issued International Patent Application Serial No. PCT/US18/35203 dated Aug. 29, 2018, 13 pages.

*Primary Examiner* — David P Porta
*Assistant Examiner* — Mamadou Faye
(74) *Attorney, Agent, or Firm* — Patent Capital Group

(57) ABSTRACT

System and apparatus for portable gas detection. Specifically, this disclosure describes apparatuses and systems for optical gas detection in a compact package. There is a need for a very compact, low-power, gas detection system for gases such as $CO_2$, $NO_x$, water vapor, methane etc. This disclosure provides an ultra-compact and highly efficient optical measurement system based on principals of optical absorption spectroscopy. It reduces the size of the instrument as well its power consumption by more than an order of magnitude making it possible to deploy it widely. There is an identified need for large number of distributed gas sensors to improve human health, environment, and save energy usage.

28 Claims, 11 Drawing Sheets

(56) References Cited

U.S. PATENT DOCUMENTS

| | | | |
|---|---|---|---|
| 2012/0267532 A1* | 10/2012 | Udrea | H05B 3/267 |
| | | | 250/338.5 |
| 2014/0070101 A1* | 3/2014 | Matsushima | G01N 21/3504 |
| | | | 250/338.5 |
| 2015/0129767 A1* | 5/2015 | Kouznetsov | G01N 21/0303 |
| | | | 250/341.1 |
| 2015/0219491 A1 | 8/2015 | Lee et al. | |
| 2017/0241904 A1* | 8/2017 | Barritault | G01N 21/3504 |

\* cited by examiner

| Sensitivity ppm | Energy mJ/read | SNR dB |
|---|---|---|
| 2000. | 0.02 | 26.21 |
| 800. | 0.02 | 33.6 |
| 100. | 0.02 | 51.308 |
| 50. | 0.02 | 57.303 |
| 1. | 32.741 | 91.257 |

FIG. 7

COMPACT OPTICAL GAS DETECTION SYSTEM AND APPARATUS

CROSS-REFERENCE TO RELATED APPLICATION

This application is related and claims priority to U.S. Provisional Application No. 62/512,407 entitled, "Compact Optical Detection System" filed on May 30, 2017, which is hereby incorporated by reference in its entirety.

FIELD OF THE DISCLOSURE

The present disclosure relates to portable gas detection. More specifically, this disclosure describes apparatuses and systems for optical gas detection in a compact package.

BACKGROUND

A nondispersive infrared sensor (or NDIR sensor) is a simple spectroscopic sensor often used as a gas detector. It is nondispersive in the sense of optical dispersion since the infrared energy is allowed to pass through the atmospheric sampling chamber without deformation.

The main components of an NDIR sensor are an infrared source (lamp), a sample chamber or light tube, a light filter and an infrared detector. The IR light is directed through the sample chamber towards the detector. In parallel there is another chamber with an enclosed reference gas, typically nitrogen. The gas in the sample chamber causes absorption of specific wavelengths according to the Beer-Lambert law, and the attenuation of these wavelengths is measured by the detector to determine the gas concentration. The detector has an optical filter in front of it that eliminates all light except the wavelength that the selected gas molecules can absorb.

Ideally other gas molecules do not absorb light at this wavelength, and do not affect the amount of light reaching the detector however some cross-sensitivity is inevitable. For instance, many measurements in the IR area are cross sensitive to H2O so gases like CO2, SO2 and NO2 often initiate cross sensitivity in low concentrations.

A common application is to use a NDIR (non-dispersive infrared absorbance) sensor to monitor CO2. Most molecules can absorb infrared light, causing them to bend, stretch or twist. The amount of IR light absorbed is proportional to the concentration. The energy of the photons is not enough to cause ionization, and thus the detection principle is very different from that of a photoionization detector (PID). Ultimately, the energy is converted to kinetic energy, causing the molecules to speed up and thus heat the gas. A familiar IR light source is an incandescent household bulb. Each molecule absorbs infrared light at wavelengths representative of the types of bonds present.

Many techniques have been proposed which typically consist of a broadband light source. Unfortunately, they require relatively long optical paths which reduce light collection efficiencies. The inventor of the present disclosure has identified these shortcomings and recognized a need for a more elegant, robust, compact optical gas detection measurement system with high collection efficiency. That is, the inventor has come up with a compact, low-power, optical gas detection apparatus which can be mass produced via packaging without yielding accuracy.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY OF THE DISCLOSURE

System and apparatus for portable gas detection. Specifically, this disclosure describes apparatuses and systems for optical gas detection in a compact package. There is a need for a very compact, low-power, gas detection system for gases such as CO2, NOx, water vapor, methane etc. This disclosure provides an ultra-compact and highly efficient optical measurement system based on principals of optical absorption spectroscopy. It reduces the size of the instrument as well its power consumption by more than an order of magnitude making it possible to deploy it widely. There is an identified need for large number of distributed gas sensors to improve human health, environment, and save energy usage.

According to one aspect of the present disclosure, an opto-electronic package for measurement of absorption of light comprises a cap covering the substrate to form cavity for measurement of absorption of gas.

According to another aspect of the present disclosure, the opto-electronic package for measurement of absorption of light further comprises a substrate with a light source disposed on it.

According to another aspect of the present disclosure, the opto-electronic package for measurement of absorption of light further comprises a substrate with at least one detector to which the cap is attached.

According to another aspect of the present disclosure, the inner shape of the cap forms a mirror in which the mirror shape is derived from the two elliptical mirror surfaces inclined substantially at 45 degrees to provide high collection of the light source to the detector.

According to another aspect of the present disclosure, the cap provides for openings for the diffusion of gas molecules.

According to another aspect of the present disclosure, the substrate and the cap provide a method of alignment to each other.

According to another aspect of the present disclosure, the opto-electronic package for measurement of absorption of light further comprises a substrate with at least two detectors disposed thereon.

According to another aspect of the present disclosure, wherein the first detector acts as a reference detector that is measures light such that its signal is substantially insensitive to the absorption by a predetermined gas.

According to another aspect of the present disclosure, the second detector that may have either optical filter attached to it or provided on top of it to make it substantially sensitive to the absorption by the predetermined gas.

According to another aspect of the present disclosure, the opto-electronic package for measurement of absorption of light further comprises many detectors in which at least one detector acts as a reference detector and the other detectors optical filters have applied to them so as to detect different gases present in the cavity.

According to another aspect of the present disclosure, the light source may be an LED or a thermal light source.

According to another aspect of the present disclosure, the opto-electronic package for measurement of absorption of light further comprises a substrate with a light source disposed on it. LED may have a center wavelength from 0.2-12 μm.

According to another aspect of the present disclosure, the detector may use direct photon absorption or may use indirect method of measurement that includes conversion to heat to measure light flux.

According to another aspect of the present disclosure, direct photon detectors include detectors made from PbSe, PbS, HgCdTe, GaSb/InAs superlattice etc.

According to another aspect of the present disclosure, indirect thermal detectors include pyroelectrics, bolometers, etc.

According to another aspect of the present disclosure, the predetermined gas may be CO2, water vapor, methane, NO, as well as vapors of various alcohols.

According to another aspect of the present disclosure, the predetermined gas may be any of the gases used in anesthesia.

According to another aspect of the present disclosure, the predetermined gas may be vapors of diesel, kerosene, or gasoline.

According to another aspect of the present disclosure, multiple gases may be simultaneously detected by using multiple detectors with optical filters chosen for each of the gases and using a broadband light source.

According to another aspect of the present disclosure, the predetermined gases may be CO2 and alcohol vapor which are simultaneously detected for breadth analysis.

According to another aspect of the present disclosure, the predetermined gases may be water and alcohol vapor which are simultaneously detected for breadth analysis.

According to another aspect of the present disclosure, the opto-electronic package for measurement of absorption of light further comprises that the openings to the cavity that forms the cap may be covered with fine mesh to prevent larger dust particles from entering the cavity.

According to another aspect of the present disclosure, the opto-electronic package for measurement of absorption of light further comprises that the package is constructed with "base package" that can be tested separately from the gas chamber and the two combined by assembly to form the complete gas detection system.

The drawings show exemplary biopotential circuits and configurations. Variations of these circuits, for example, changing the positions of, adding, or removing certain elements from the circuits are not beyond the scope of the present invention. The illustrated smoke detectors, configurations, and complementary devices are intended to be complementary to the support found in the detailed description.

BRIEF DESCRIPTION OF THE DRAWINGS

For a fuller understanding of the nature and advantages of the present invention, reference is made to the following detailed description of preferred embodiments and in connection with the accompanying drawings, in which:

FIG. 7 depicts exemplary chart comparing sensitivity, energy and signal-to-noise ratio (SNR) for an optical gas detection measurement system, in accordance with some embodiments of the disclosure provided herein;

DETAILED DESCRIPTION

Figure 1B:
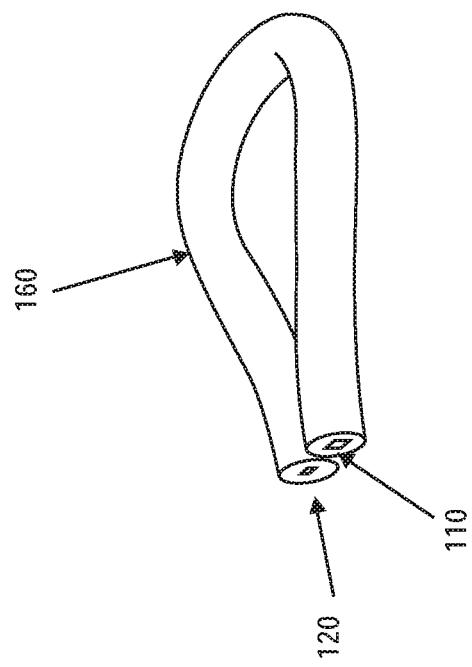
FIG. 1B shows an exemplary optical gas detection measurement system utilization a bent tube, in accordance with some embodiments of the disclosure provided herein.

The present disclosure relates to portable gas detection. More specifically, this disclosure describes apparatuses and systems for optical gas detection in a compact package. The inventors of the present disclosure contemplate novel packaging using geometric optics to engender a compact, robust, and low-power gas detector.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

One of the most popular technique for quantitative measurement of the industrially significant gases such as $CO_2$, $NO_x$, water vapor, methane etc. is carried out by optical absorption. Most of these gases have strong vibrational absorption spectra in the 1-12 μm region of electromagnetic spectrum and include various vibrational modes and its overtones.

A fundamental measurement technique consists of a measuring changes in the extinction of the light source at a particular wavelength of interest as the concentration of the target gas is varied. This technique is popularly called non-dispersive infra-red (NDIR) technique.

Many devices are available on the market. They typically consist of a broadband light source—thermal such as light bulb or a compact heater or an LED—whose output is passed thru an optical system that provides a relatively long path length for absorption of gas and a detector system to measure extinction. Small holes in the optical system allows the gas to diffuse into the light path.

The detector system itself may consist of two detectors. One detector provides a reference signal and is specifically tuned to reduce or avoid gas absorption lines of interest to measure drift and changes in the light source and condition of the optical channel. The other detector is tuned to the wavelength of absorption of the gas to be measured.

Many configurations of the optical systems have been proposed in the past, and some of these devices are available on the market. One of the most popular gases to be measured is $CO_2$. In the discussion below on the design of a novel optical package, the focus will be on $CO_2$ gas to make the discussion specific, but the principal applies to many of the industrially relevant gases mentioned earlier and is quite general.

Furthermore, the present disclosure will focus on systems that use room temperature detectors and are not cooled since cooling adds cost, increases power consumption, and increases system complexity. However, active and/or passive cooling are not beyond the scope of the present invention.

A few basic equations are required in order to appreciate a preferred embodiment and compare it to the previous devices. The basic equation that allows measurement is:

$$S = \gamma \int I_o(\lambda) F(\lambda,\lambda_0,\Delta\lambda) \exp(-\alpha(\lambda) c L_{\mathit{eff}}) d\lambda$$

In the above equation, $I_o(\lambda)$ is the intensity of the source, $F(\lambda,\lambda_0,\Delta\lambda)$ represents the optical filter centered on the absorption line at $\lambda_0$, $\alpha(\lambda)$ is the absorption coefficient of the gas per unit concentration, c is the concentration and the $L_{\mathit{eff}}$ is the effective optical path length for the absorption. The factor $\gamma$ represents overall transmission efficiency of the optical system from the light source to the detector where the final radiation S is measured. Note that the factor $\gamma$ depends on the details of the optical system such as the reflectivity of the mirrors if there are any, attenuation of intensity from propagation in free space, detector area, collection optics etc.

The integration over wavelength can be carried out once the optical system is defined. This gives a simpler equation where all the symbols have the same meaning but not represents effective values as a result of the integration.

$$S = I_s \Gamma \exp(-\alpha_{\mathit{eff}} c L_{\mathit{eff}})$$

Thus, for any optical system based on specific absorption of lines, we can write down the above equation. It shows that the signal at the detector is proportional to the source intensity $I_s$, attenuation thru the optical system and the properties of the optical filters represented by the overall collection efficiency $\Gamma$, as well as the effective wavelength weighted absorption coefficient.

The sensitivity of this instrument to the changes in the gas concentration can be estimated by simply taking the derivative of the above equation.

$$\delta S = -(\alpha_{\mathit{eff}} L_{\mathit{eff}} S) \delta c$$

Consider a practical case, where the absorption of gas is not very strong, i.e., the term in the argument of the exponential is very small and the exponential is of the order of unity. This means that (ignoring the negative sign):

$$\delta S \sim (\alpha_{\mathit{eff}} L_{\mathit{eff}} I_s \Gamma) \delta c$$

Or, $$\delta c \sim \frac{\delta S}{\alpha_{\mathit{eff}} L_{\mathit{eff}} I_s \Gamma}$$

Noise from the detector system can now be added to set the detection limit. Clearly, the limit on the sensitivity $\delta c_m$ is reached when the noise equivalent power (NEP) of the detector in a given measurement interval T equals $\delta S$. Putting it all together yields:

$$\delta c_m \sim \frac{NEP\left(\frac{1}{\sqrt{T}}\right)}{\alpha_{\mathit{eff}} L_{\mathit{eff}} I_s \Gamma} \text{ or } \delta c_m = \frac{NEP\left(\frac{1}{\sqrt{T}}\right)}{\alpha_{\mathit{eff}} L_{\mathit{eff}} S}$$

In the equation above NEP is in $W\,Hz^{-1/2}$.

Typically, the light source intensity has an upper limit given by the physical characteristics of the source. The light source is responsible for most of the power consumption of the system and keeping it on for a long time may lead to other errors due to substantial heating of the measurement cavity. The detectors in the IR region of the spectrum (from 1-12 μm) have NEP that ranges from ~100 pW/rtHz to 10's of nW/rtHz at room temperature. Thus, providing a gas detection system with high sensitivity and low power can only happen if the collection efficiency is high and path length is long.

An object is to maximize the product $\Pi = L_{\mathit{eff}} S$ or the simplified product $\Pi = L_{\mathit{eff}} \Gamma$. A preferred embodiment and its generalizations provide a highly cost-effective and scalable method to maximize this product.

But these two factors cannot be changed independently. For example, one may increase the effective path length by using collimating optics but this will necessarily reduce the collection efficiency from the light source due to the conservation of etendue of the light source. Etendue is a property of light in an optical system, which characterizes how spread out the light is in area and angle.

From the source point of view, it is the product of the area of the source and the solid angle that the system's entrance pupil subtends as seen from the source. Equivalently, from the system point of view, the etendue equals the area of the entrance pupil times the solid angle the source subtends as seen from the pupil. These definitions must be applied for infinitesimally small elements of area and solid angle, which must then be summed over both the source and the diaphragm as shown below. Etendue may be considered to be a volume in phase space.

Etendue is important because it never decreases in any optical system where optical power is conserved. A perfect optical system produces an image with the same etendue as the source. The etendue is related to the Lagrange invariant and the optical invariant, which share the property of being constant in an ideal optical system. The radiance of an optical system is equal to the derivative of the radiant flux with respect to the etendue.

Etendue particularly affects extended light sources such as LED or lamps and hot micro-electro-mechanical (MEMS) elements. While one may use a long tube with highly reflective inner walls, the tube may itself be coiled to reduce device volume. This will increase the path length but can reduce the light reaching the detector. The decrease is received light is caused by a large number of reflections and an invariable increase in etendue due to imperfections in the sidewalls of the tube.

Furthermore, detector rarely collects all the light leaving the aperture of the tube unless tube's diameter is matched to the detector. In such a case, loss from reflection can be substantial. It is important to bear in mind that collecting as much light as possible from an extended source such as LED or lamp while maintain long path length is not easy and has proven challenging.

Figure 1A:
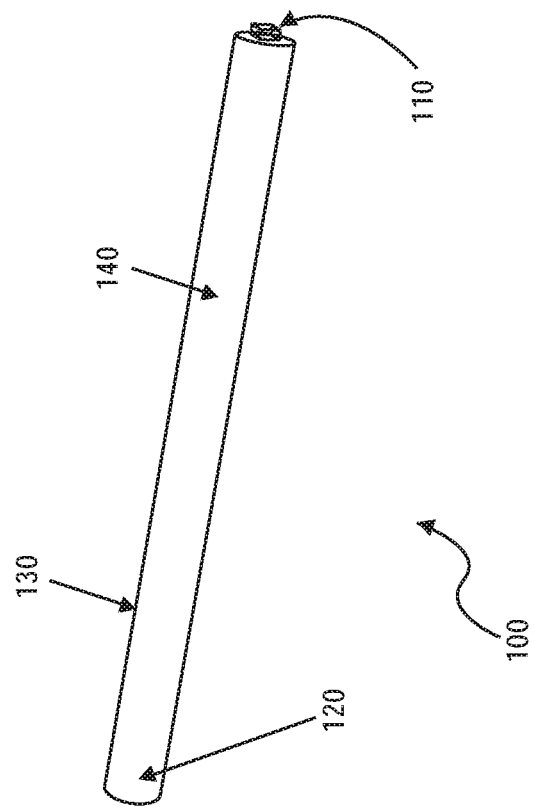
FIG. 1A shows an exemplary optical gas detection measurement system utilization a straight tube, in accordance with some embodiments of the disclosure provided herein.

FIG. 1A shows an exemplary optical gas detection measurement system 100 utilization a straight tube 140 which comprises a mirror 130, in accordance with some embodiments of the disclosure provided herein. Similarly, FIG. 1B shows an exemplary optical gas detection measurement system 150 utilization a bent tube 160, in accordance with some embodiments of the disclosure provided herein. Both will be discussed in greater detail.

optical gas detection measurement system 100, 150 both comprise light sources 110 and detectors 120. The above discussed techniques are examples of implementation depicted in FIGS. 1A and 1B. Calculations for a simple tube with inner wall reflectivity R (<1) shows that the effective path length is only slightly greater than the length of the tube and the collection efficiency depends strongly on the reflectivity of the inner surface and the tube diameter.

Even slight change in the reflectance of the tube will cause rapid decrease in the collection efficiency. For example, a 40 mm long tube (R=0.9) with 2 mm inner diameter and a 1 mm detector will only collect ~4% of the light. This does not include losses from scattering due to roughness of the wall. Also, since multiple reflections occur, expensive optical coatings have to be applied to the inner wall in order to have stable reflectivity over many years. The assembly operation invariably requires non-planar electronic assembly as the LED and detectors must face the open face of the tube. This is often more complex and expensive than traditional planar assembly.

There is a need for a very compact, low-power, gas detection system for gases such as $CO_2$, $NO_x$, water vapor, methane etc. This disclosure provides an ultra-compact and highly efficient optical measurement system based on principals of optical absorption spectroscopy. It reduces the size of the instrument as well its power consumption by more than an order of magnitude making it possible to deploy it widely. There is an identified need for large number of distributed gas sensors to improve human health, environment, and save energy usage.

Figure 2A:
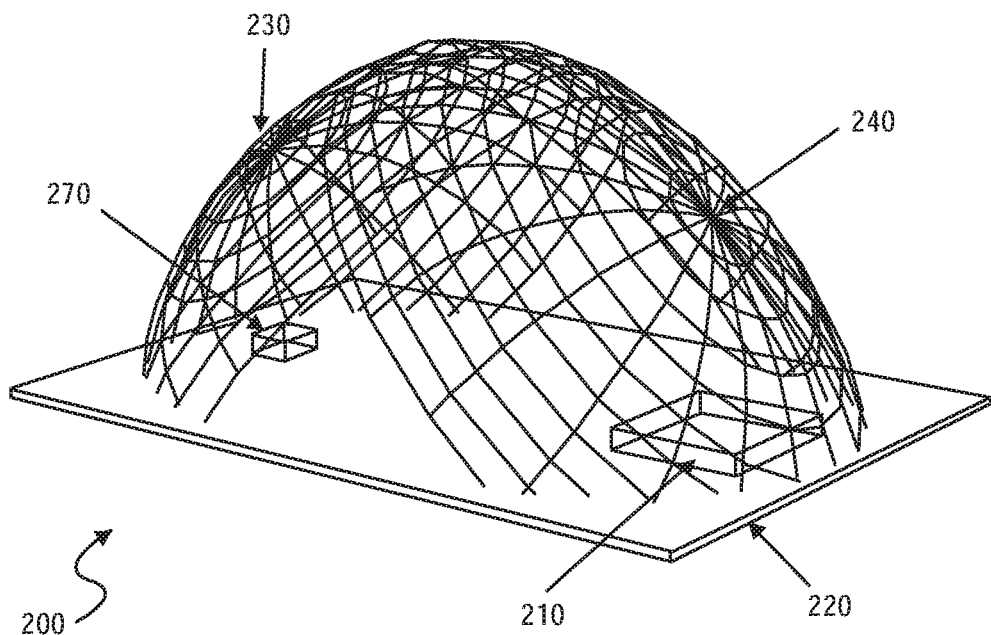
FIG. 2A shows an exemplary optical gas detection measurement system substrate, in accordance with some embodiments of the disclosure provided herein.
Figure 2B:
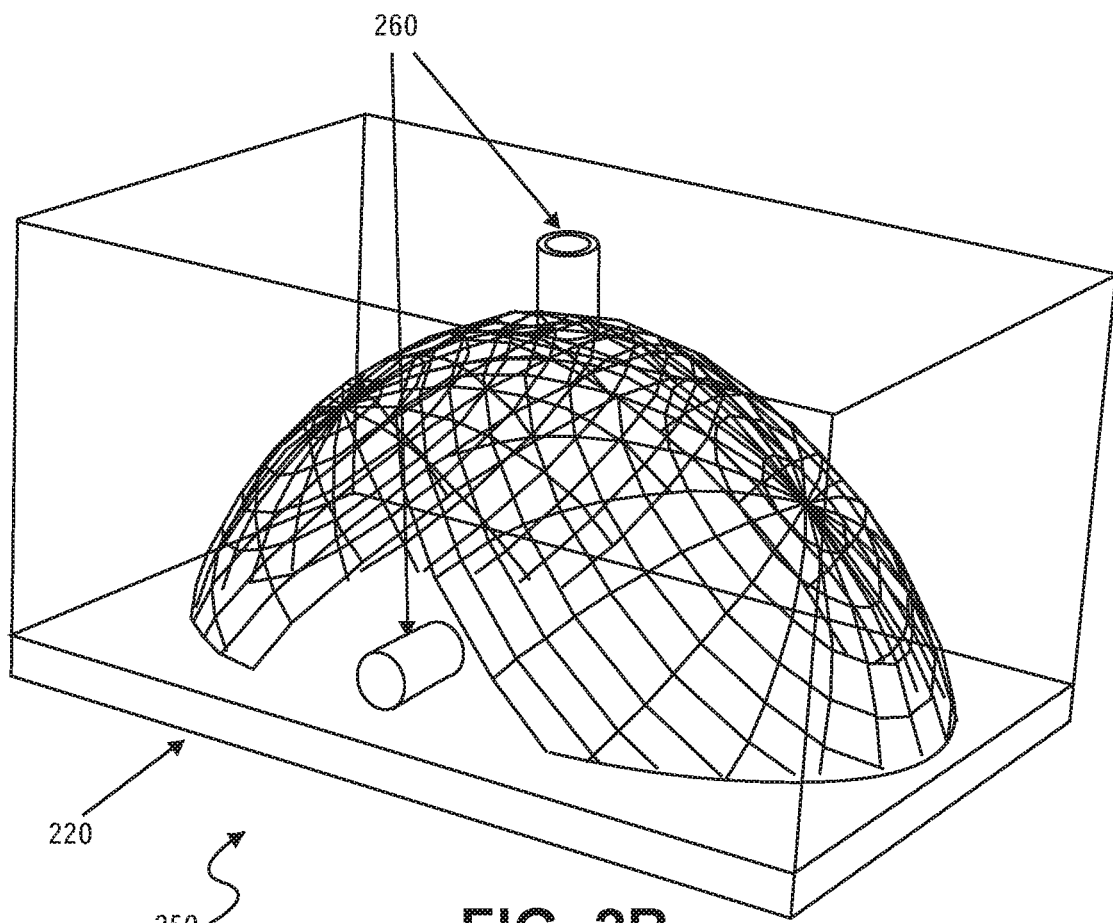
FIG. 2B shows an exemplary optical gas detection measurement system in a completed package, in accordance with some embodiments of the disclosure provided herein.

FIG. 2A shows an exemplary optical gas detection measurement system substrate 200, in accordance with some embodiments of the disclosure provided herein. Similarly FIG. 2B shows an exemplary optical gas detection measurement system in a completed package 250, in accordance with some embodiments of the disclosure provided herein. Both are now discussed together.

According to one or more embodiments, an entire package and all of the relevant elements are shown in FIG. 2. It comprises of a laminate or a substrate 220 on which is mounted an LED or a light source 270. In some embodiments, there might be multiple light sources next to each other which emit light at the required wavelengths for the gas to be detected and a detector 210 or detectors as shown. Some of the light sources are thermal such as a lamp or heated filament and are broadband. These may be particularly useful in measuring multiple gases simultaneously. For the sake of specificity, brevity and clarity, the disclosure shall continue to use LED 270 but it represents any light source.

In one or more embodiments, a complex mirrored surface is disposed on the substrate 220. The surface's primary function is to collect light with high efficiency from the LED 270 and collect it on the detector surface 210. This is primarily accomplished by using two elliptical mirror surfaces placed in a fashion described below. The foci 230, 240 represent the foci of the elliptical mirror surface.

The light absorption takes place in a cavity primarily formed by the arrangement of these two elliptical mirror surfaces which are tilted by 45 degrees so as to make an optical system that transports the light from the LED 270 to the detectors 210. The center of the mirrors is predominantly aligned to the center of the LED 270 and the detector 210 system.

These elliptical mirrors may be made using molded components with metallic coatings applied to the mold to form a reflector and as such the entire mirror assembly with side wall mirrors and the elliptical mirrors may represent a single molded part. This is illustrated in FIG. 2B. There are also "holes" 260 provided in the mold for the exchange of gases with the environment. These holes may be numerous and may have differing openings for efficient exchange. The size of the system is evident from the scale on the axis which is in mm.

While only one detector 210 block is shown in the figure, it may consist of multiple detector elements. As is common in practice, one of the detector element may provide a reference channel for normalizing variation in the LED 270 output as well as long term drifts in the package, reflectivity of the mirrors etc. For the $CO_2$ detection, LED 270 may predominantly produce light around 4.3 μm wavelength where $CO_2$ shows prominent absorption bands. One detector may collect all the light from the LED 270 while the other detector may include an optical filter near or on its surface to selectively transmit light near 4.3 μm.

Figure 3:
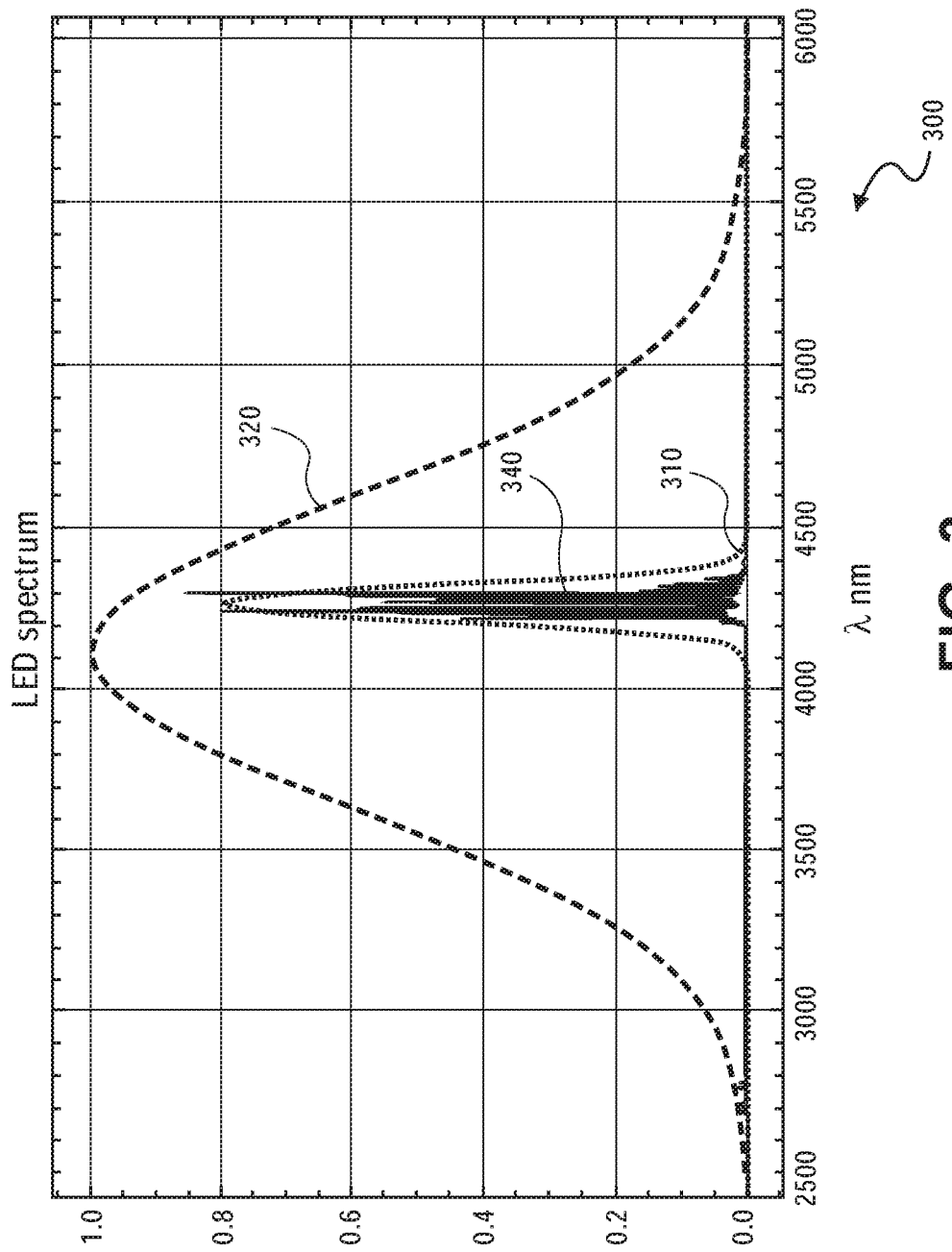
FIG. 3 depicts an exemplary absorption spectrum, in accordance with some embodiments of the disclosure provided herein.

FIG. 3 depicts an exemplary absorption spectrum 300, in accordance with some embodiments of the disclosure provided herein. The spectra of a particular LED, optical filter centered on the absorption bands of $CO_2$ as well its absorption spectra are shown in FIG. 3. The absorption spectra 300 comprises the bandwidth 320 of an exemplary LED.

Since the bandwidth of $CO_2$ 340 is desired, an optical filter 310 is used to filter out the rest of the spectra. One skilled in the art will recognize that these bandwidths and center wavelengths will vary based type of gas absorption and type of optical filter.

Figure 4:
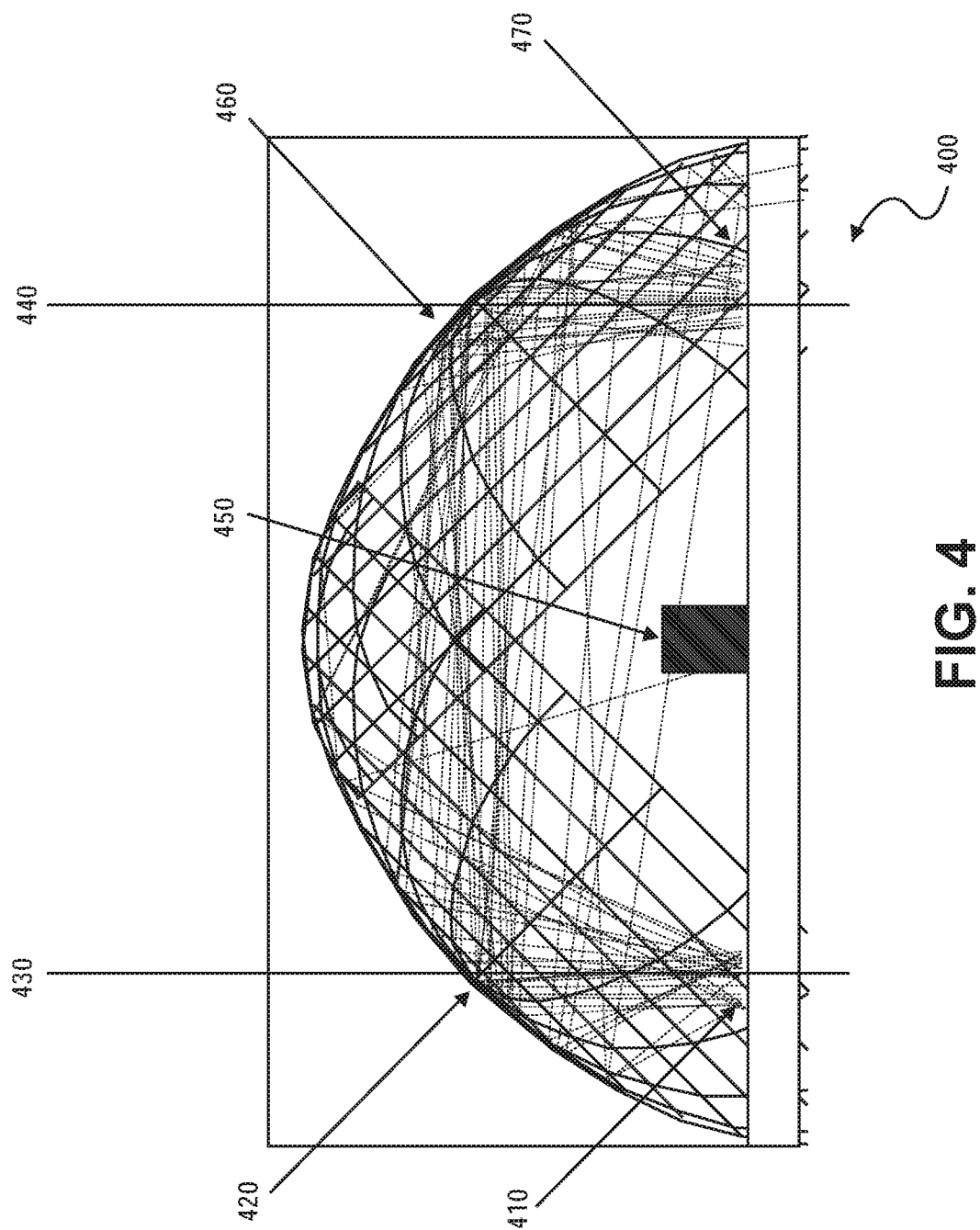
FIG. 4 shows an exemplary optical gas detection measurement system comprising a blocking element and illustrating exemplary ray tracing, in accordance with some embodiments of the disclosure provided herein.

A complete ray trace of the system is shown in FIG. 4. FIG. 4 shows an exemplary optical gas detection measurement system 400 comprising a blocking element 450 and illustrating exemplary ray tracing, in accordance with some embodiments of the disclosure provided herein.

optical gas detection measurement system 400 comprises LED 410, detector 470, first elliptical mirror 420, second elliptical mirror 460, and mirror's symmetry axes 430, 440 whereby the LED's 410/detector 470 centers are nominally aligned.

The elliptical mirror surfaces 420, 460 are generated by using the general equation of ellipsoid and then rotating and then translating the ellipsoid to the location shown in the FIG. 2 and FIG. 4. The height z shown in FIG. 4 is adjusted to produce the best capture of rays on the detector surfaces. In one or more embodiments, the height is the distance from the optical elements to the foci of the ellipsoids. Z is closely related to the shape of the ellipsoid. The un-rotated ellipsoid may be written as:

$$\frac{x^2}{a^2} + \frac{y^2}{b^2} + \frac{z^2}{c^2} = 1$$

For the FIG. 4 shown here we have chosen the parameters b=c=1.6 mm; a=$\sqrt{c^2+f^2}$; f=z=2 mm. The ellipsoid above the LED 410 is rotated about the y-axis by 45 degree and then translated by the same distance as the LED 410 is from the center, which in this case is also f. Second mirror 460 surface over the detector is similarly generated by the rotation and translation, but now in the opposite direction. Note that while the parameter f and z coincide in this case, they will not coincide in general.

In one or more embodiments, optical barriers 450 are disposed between the LED 410 and the detector to avoid direct radiation than has a substantially shorter path. This is also shown in FIG. 4. This can create errors in the calibration of the instrument.

The design shown here is substantially different than the well-known single elliptical mirror based optical designs where one uses the fact that the light rays starting from one of its foci will converge on its second foci. Such a design is not practical as the size of the mirror and the optical path are determined directly by the parameters of the ellipse.

Figure 5:
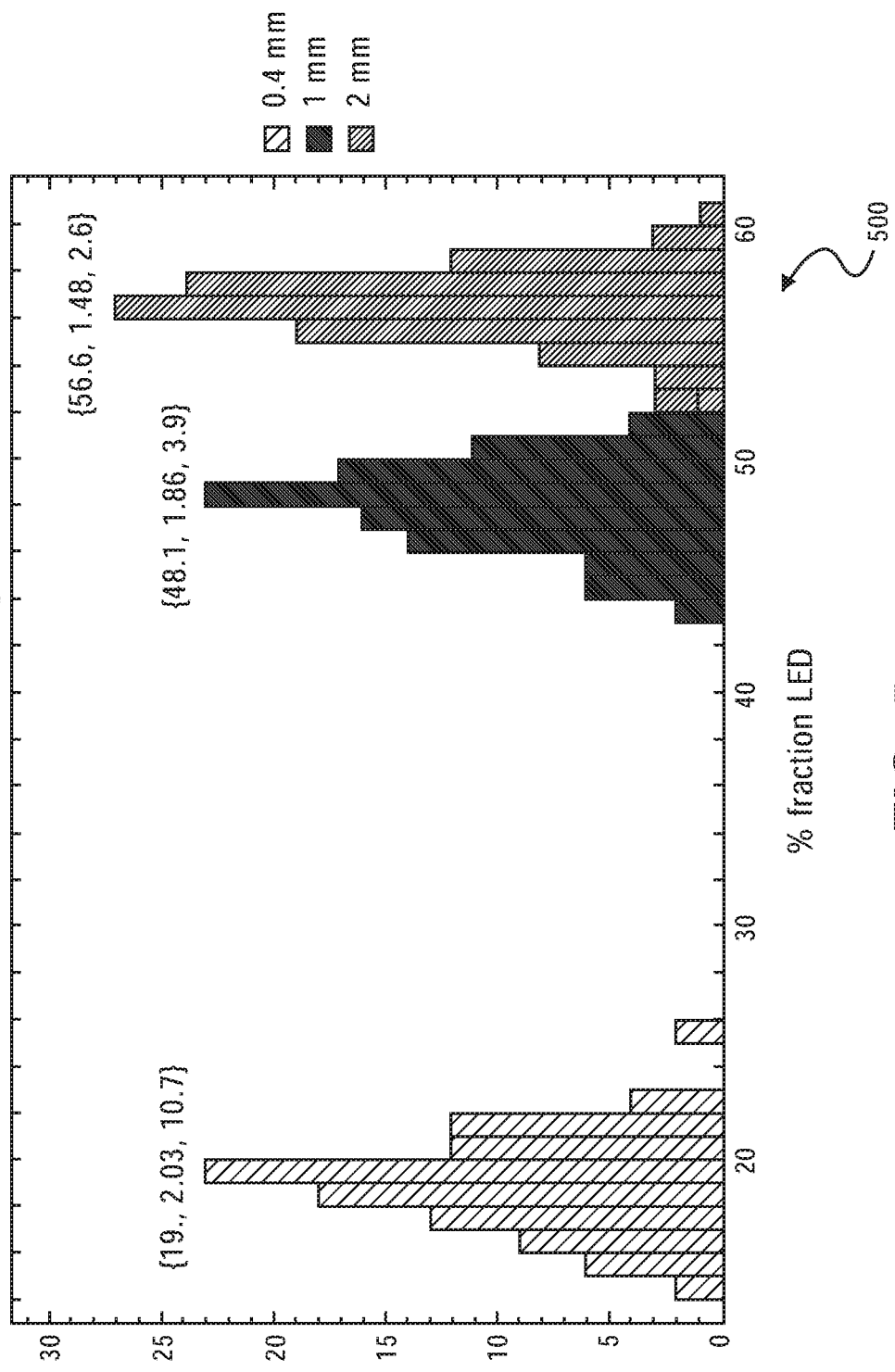
FIG. 5 depicts exemplary efficiency for an optical gas detection measurement system, in accordance with some embodiments of the disclosure provided herein.

The design shown in the embodiment has several benefits over the current state-of-the-art:

It is robust to the variations in the LED/detector placement with respect to the curved mirror surfaces. This invariably occurs during the process of assembly. This is shown in FIG. 5 and discussed in greater detail below.

Additionally, it is very efficient at collecting large portion of the light emanating from a diffuse light source such as LED or a lamp. This is also indicated in FIG. 5. FIG. 5 depicts exemplary efficiency 500 for an optical gas detection measurement system, in accordance with some embodiments of the disclosure provided herein. FIG. 5 also illustrates the robustness to placement error for different detector size.

The design allows use of high-volume manufacturing technology such as single piece precision molds to form high quality optical surfaces and form optical cavity for gas sensing. These cavities can be easily assembled with the substrate populated with detectors and LED on a laminate.

Continuing on with the benefits, the present embodiment uses standard, planar electronic assembly. It uses only reflective optics. This allows use with entire optical spectrum accessible with available light sources from 0.2-12 µm.

It has one of the highest product of optical path length and the collection efficiency or product Π as discussed earlier. This leads to smallest sensor system with very low power consumption.

It accommodates many kinds of light sources: from flat LED source to a heater filament of a micro-electro-mechanical (MEMS) device to a traditional lamp.

As shown in FIG. 5, this design permits very high light collection efficiency. This is the key reason for compactness of the sensor system. In general, given the molecular absorption coefficient of any gas, signal-to-noise ratio (SNR) needed to achieve certain accuracy in measurement in ppm is fixed for a particular path length of absorption.

In a limit of weak absorption—so that we can linearize exponential absorption—we can write in general:

$$SNR_{min} = \frac{\delta S}{N} = \frac{S_r \text{Exp}(-\alpha_{av}\delta_{ppm}L)}{N} \sim \frac{S_{rx}(-\alpha_{av}\delta_{ppm}L)}{N} = \frac{S_{led}\eta_{opt}(-\alpha_{av}\delta_{ppm}L)}{N}$$

We have absorbed the effect of filter and absorption as a function of wavelength in effective absorption coefficient of the gas through the filter $\alpha_{av}$.

Increasing L decreases the signal-to-noise ratio (SNR) requirement for a given required ppm accuracy. Thus, one would need smaller signal to overcome noise from the receiver system.

The amount of source light needed $S_{led}$ depends on the product $\eta_{opt}L$. The factors being common. Of course, it goes without saying that using lower noise system with smaller N benefits any system of measurement.

But, since the light source is an LED or one that radiates in all directions such as a thermal one, the optical requirements to collect light from the light source becomes more challenging and generally longer path length implies lower optical collection efficiency $\eta_{opt}$ of the system. This is because the optical system becomes more sensitive to the manufacturing variations.

For example, for a 10 cm path length provided by the long reflective tubes, which are quite insensitive to the placement of the LED and the detector have optical efficiency of ~1% or less.

Thus, many prior systems have lower $\eta_{opt}L$ product than the disclosed invention. This allows us to maintain required signal-to-noise ratio (SNR), lower power consumption and make compact package.

The entire design is scalable to accommodate different sized light sources and detector systems. This is discussed below and a larger system is shown in FIG. 6.

Figure 6:
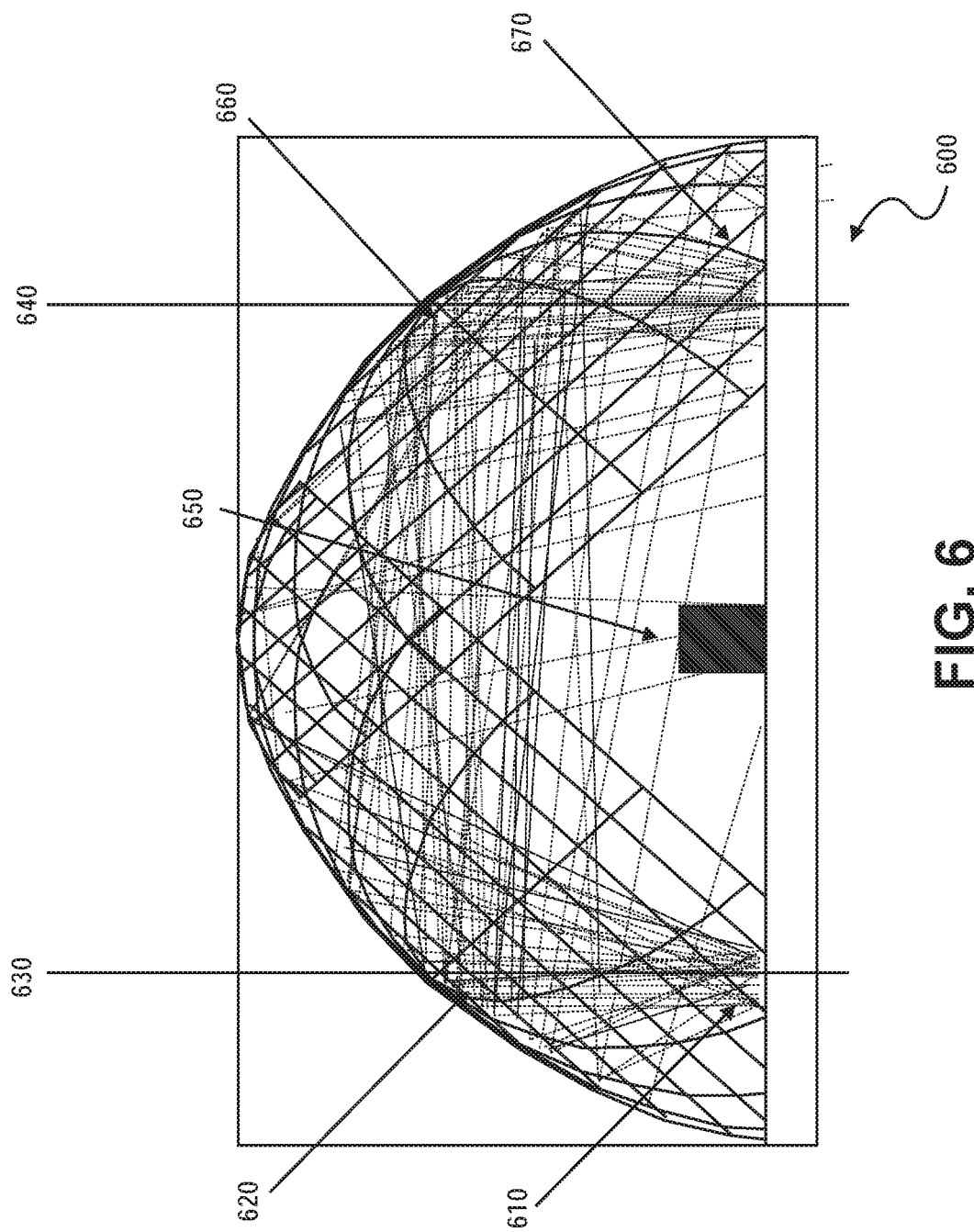
FIG. 6 shows an exemplary scaled optical gas detection measurement system comprising a blocking element and illustrating exemplary ray tracing, in accordance with some embodiments of the disclosure provided herein.

FIG. 6 shows an exemplary scaled optical gas detection measurement system 600 comprising a blocking element 650 and illustrating exemplary ray tracing, in accordance with some embodiments of the disclosure provided herein. optical gas detection measurement system 600 comprises LED 610, detector 670, first elliptical mirror 620, second elliptical mirror 660, and mirror's symmetry axes 630, 640 whereby the LED's 610/detector 670 centers are nominally aligned.

The variation in the relative alignment of various components during high volume electronic assembly process. Typical misalignment in placement can be ~+/−100 µm. What is shown below by detailed calculations that the embodiment remains efficient at collecting light and robust to these variations.

Results of these detailed monte-carlo simulation are presented in FIG. 5. In this case, the three histograms represent the fraction of LED light collected by different sized square detectors. As one can see, this optical package design is quite robust to these variations. It also collects a large fraction of the light while providing ~7.2 mm of optical path length. Thus, this particular optical system provides very large product $L_{eff}S$ (almost 10× compared to the commercial systems) resulting in a high sensitivity while still maintaining total measurement volume of <6*4*4 mm³~100 mm³. This is 100× smaller in volume than the commercially available systems.

FIG. 7 depicts exemplary chart comparing sensitivity, energy and signal-to-noise ratio (SNR) for an optical gas detection measurement system, in accordance with some embodiments of the disclosure provided herein. FIG. 7 shows evidence that it is possible to reach 1 ppm for CO2 with this design. The sensitivity for any other gas for the same power and signal-to-noise ratio (SNR) is to simply divide it by K if $\alpha_g = \kappa \alpha_{CO_2}$.

Detailed simulations of the actual LED's efficiency and the detector systems noise floor combined with the ray tracing results shown above suggests that better than 50 ppm measurement sensitivity for $CO_2$ is achievable for very low power making it possible to use these devices in a battery-operated system for many years. In fact, it may be possible to reach <1 ppm measurement accuracy for $CO_2$ even with a small measurement length.

The estimates from the simulations are shown in FIG. 7. Now the $CO_2$ has a relatively large absorption cross-section at 4.3 μm. As we showed earlier, the sensitivity limit for different gases is simply inversely proportional to $\alpha_{eff}$. Thus, 10 ppm limit for $CO_2$ is equivalent to 100 ppm limit for another gas that has a tenth of the absorption relative to $CO_2$. Or we may write that for any gas "g" with its effective absorption cross-section κ times smaller than $CO_2$ then we have, $$\delta c_g = \frac{1}{\kappa} \delta c_{CO_2} \text{ if } \alpha_g = \kappa \alpha_{CO_2}$$

Note that this assumes that the LED efficiency and the detector's NEP are not very different at the wavelength for the gas "g". For example, one can imagine suing the same small measurement device for measuring alcohol in the human breath. The US standard for legal limit ~200 ppm or 350 μg/L is quite possible. With the disclosed device one can simultaneously measure $CO_2$ and water vapor in the human breath along with the alcohol. This would require 4 detectors to measure the absorption of light in three bands corresponding to the three gases as well as a reference sensor.

Note that the entire solution is scalable to different sizes. The mirrors can be made bigger to increase path length or to accommodate multiple components in the cavity. Another solution is shown in FIG. 6 which is larger than the solution shown in FIGS. 2 and 4. The larger packages may be necessary to accommodate more detectors or larger light sources. In this case, the parameters are b=c=1.9 mm; a=$\sqrt{c^2+f^2}$; f=3 mm; z=f+0.5 mm. The optical path length is almost 10.6 mm while still collecting 50% of the light from the LED on the 2 mm sized detector.

Figure 8:
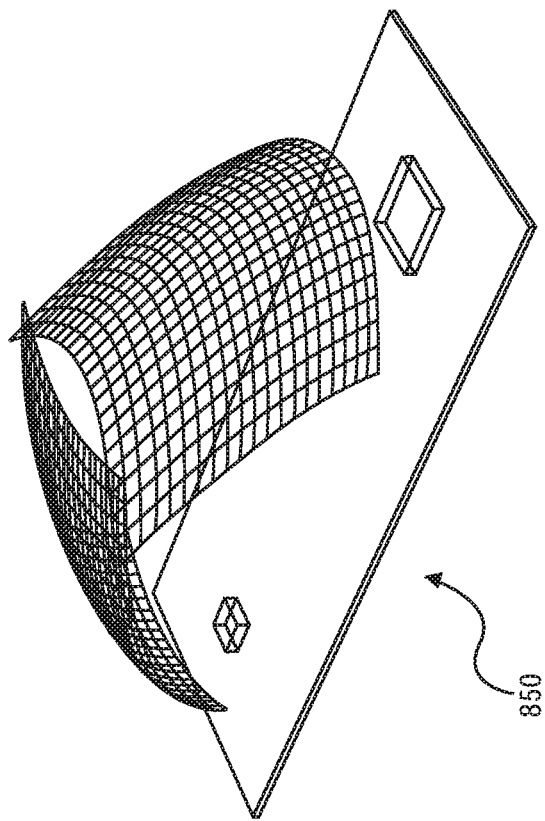
FIG. 8 illustrates an isometric view of an exemplary optical gas detection measurement system, in accordance with some embodiments of the disclosure provided herein.
Figure 8:
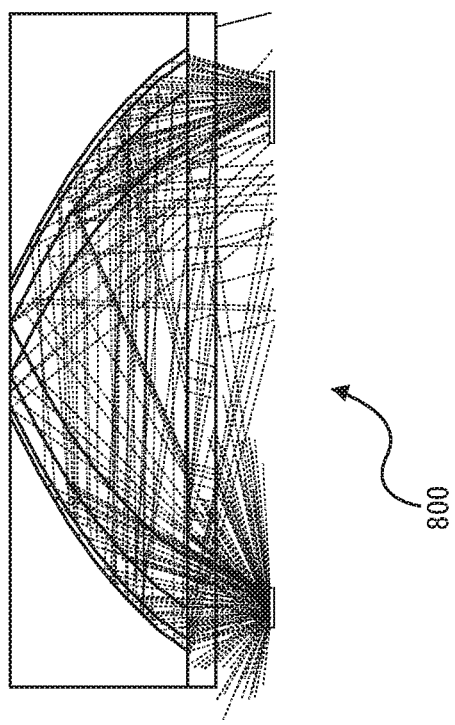

There are many other solutions that differ in the actual values of the parameters of the surface that generates elliptical surfaces. Optical path lengths as large as 34 mm are possible while keeping the collection efficiency as high as 25%. FIG. 8 shows a solution using parabolic mirrors that is similar in performance to the elliptical surface described earlier. FIG. 8 illustrates an isometric view 850 and a side ray tracing view 800 thereof of an exemplary optical gas detection measurement system, in accordance with some embodiments of the disclosure provided herein. In another embodiment, FIG. 8 depicts the mirror surfaces as parabolic or paraboloid.

Figure 9:
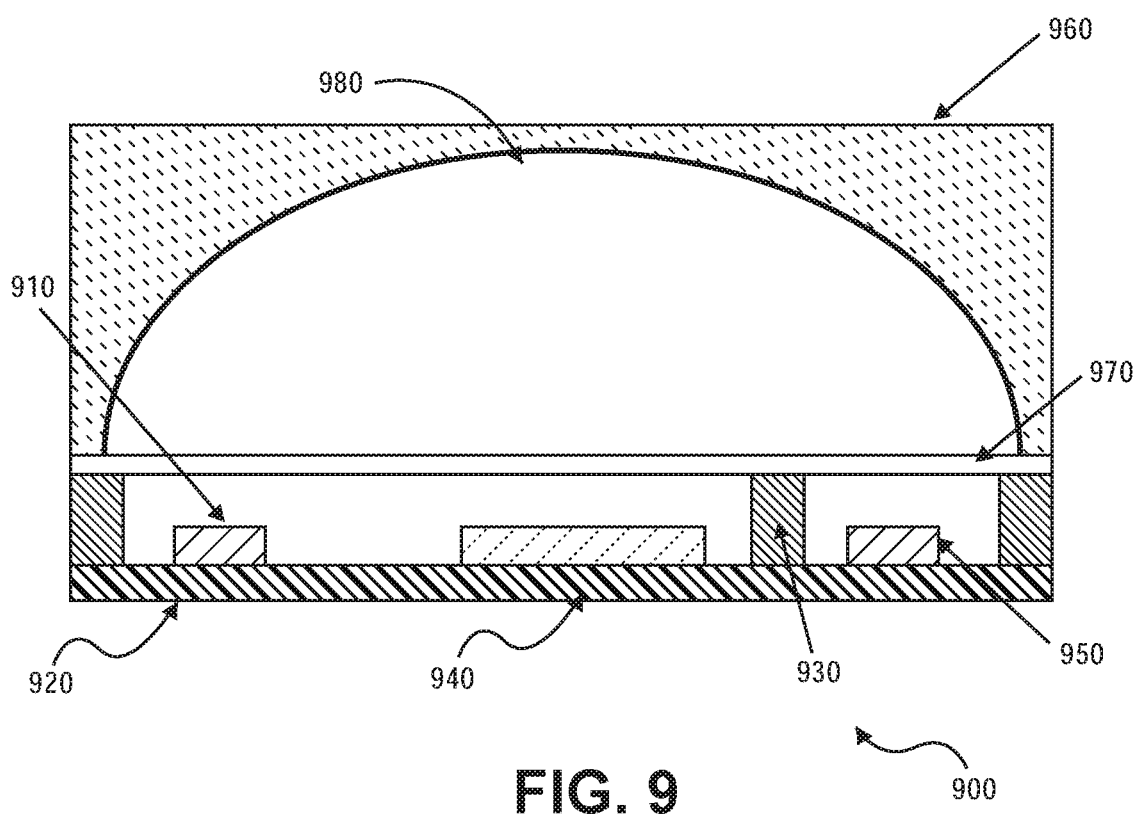
FIG. 9 shows a side view of an exemplary optical gas detection measurement system, in accordance with some embodiments of the disclosure provided herein.

Furthermore, substrate containing LED and the detectors may have alignment marks to improve alignment of the substrate to the mirror mold. FIG. 9 shows a side view of an exemplary optical gas detection measurement system 900, in accordance with some embodiments of the disclosure provided herein.

In general, the inventor proposes to prepare a "base package" comprising LED 920, detector 950, ASIC 940 for read out and LED drive as well as IR transparent cover 970 as shown in FIG. 9. IR transparent cover 970 can be made of Si or Ge or ZnSe or $Al_2O_3$. However, any suitable transparent material is not beyond the scope of the present disclosure.

The base package is easily manufactured on substrate 920. This base package can be tested for LED and detector performance in high volume when LED and detector are easily accessible in high volume testing machines and the package remains relatively flat.

This package may contain alignment marks to ease the alignment of the separate molded part 960 containing parabolic or elliptical mirrors and a gas chamber 980 as shown. For example, the base package may have predrilled holes while the mold containing mirror surface may have pins to ease alignment. The entire assembly provides quite a few "holes" and "slots" for the gas to diffuse into the cavity for measurement.

Figure 10:
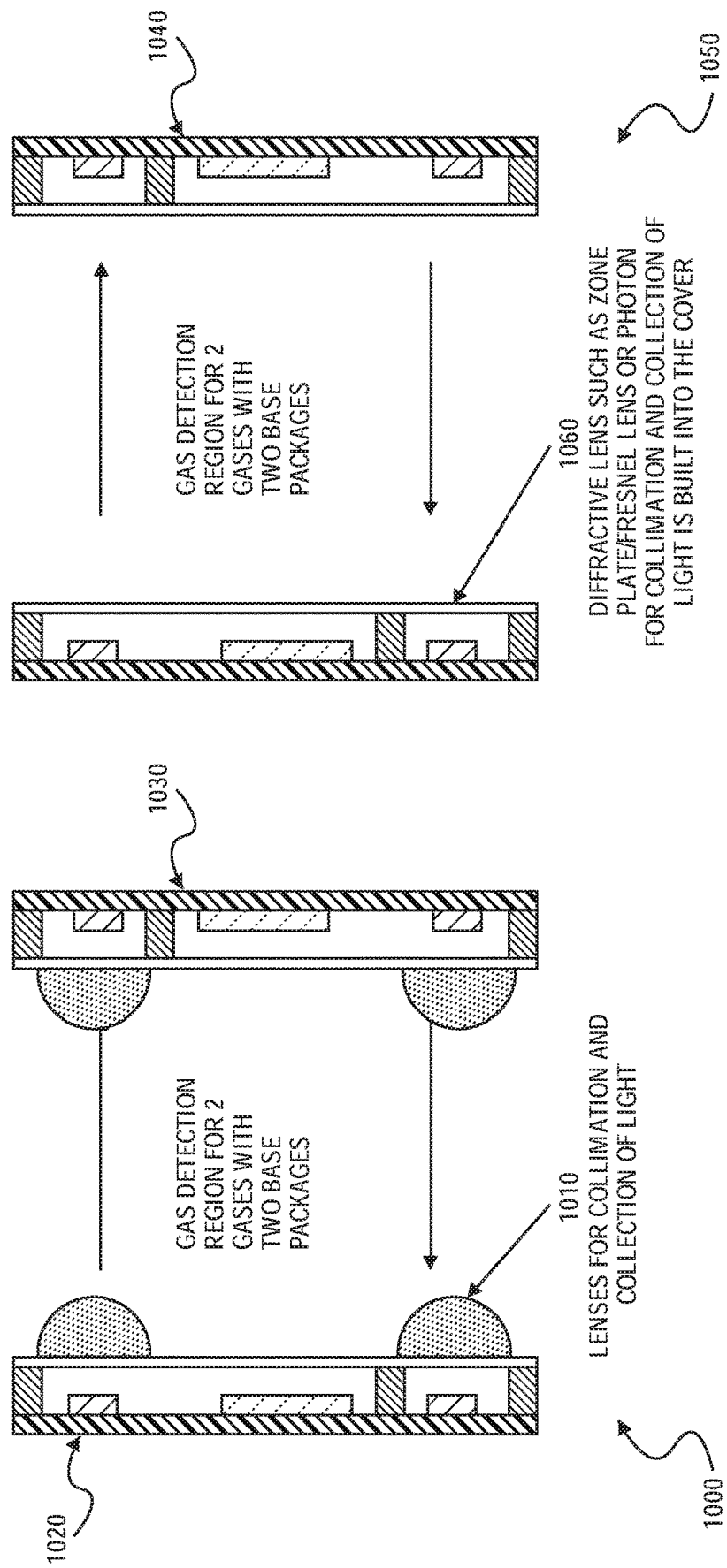
FIG. 10 shows an exemplary optical gas detection measurement system with two base packages, in accordance with some embodiments of the disclosure provided herein; and, FIG. 11 illustrates an isometric view of an exemplary optical gas detection measurement system in a completed package, in accordance with some embodiments of the disclosure provided herein.

The "base package" can be used directly in gas sensing with high light collection efficiency as shown in FIG. 10. FIG. 10 shows an exemplary optical gas detection measurement system with two base packages 1020/1030 and 1060/1040, in accordance with some embodiments of the disclosure provided herein. This is useful in straight path detection.

In this case we may use traditional bulk lenses 1000 or diffractive lenses 1050 etched directly into cover. Diffractive lens can include zone plate/Fresnel lens or Photon Sieve for collimation and collection of light is built into the cover. Use of 2 base packages automatically allows one to use the two LED/detector pairs for two separate gases.

Figure 11:
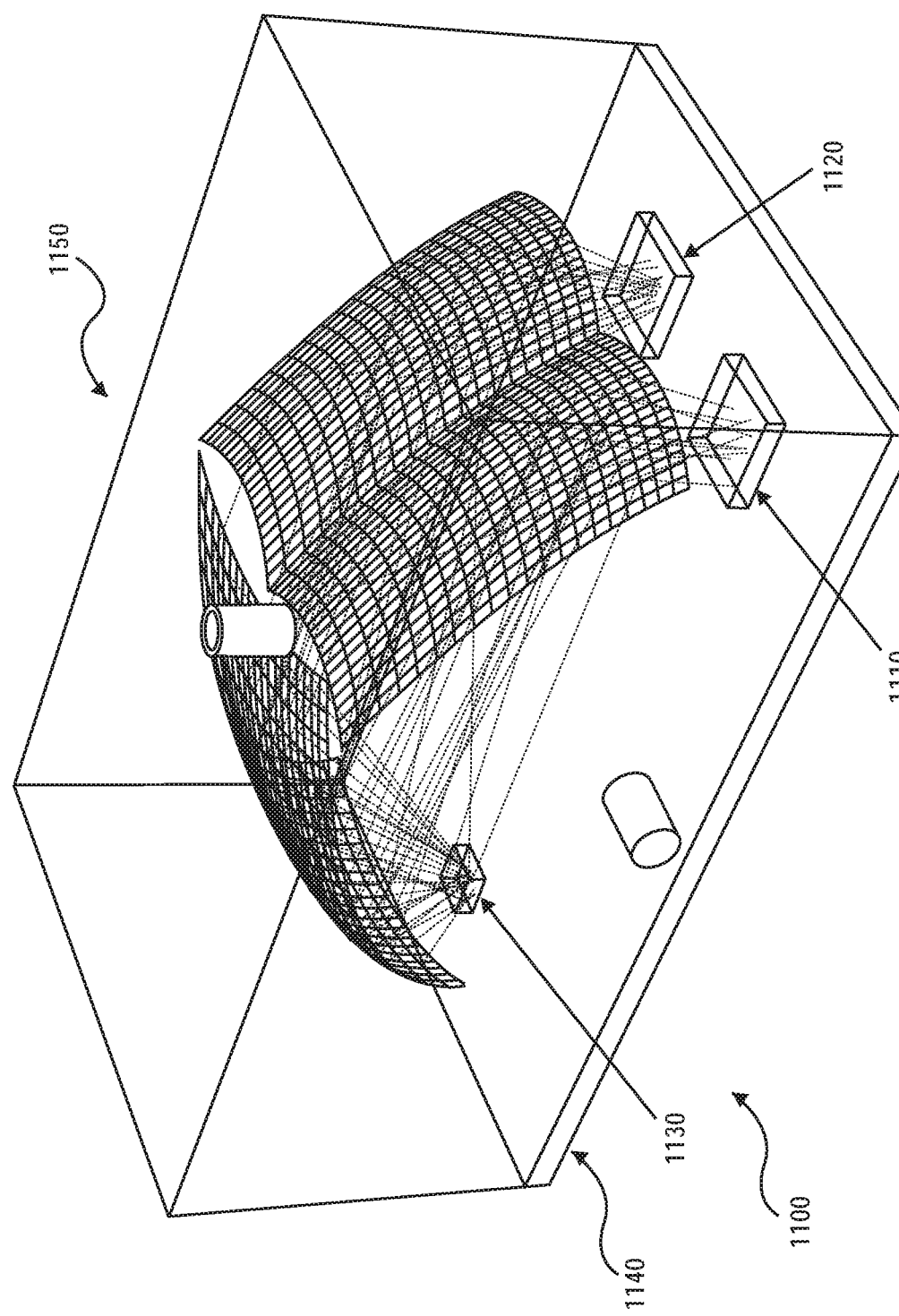

FIG. 11 illustrates an isometric view of an exemplary optical gas detection measurement system 1100 in a completed package, in accordance with some embodiments of the disclosure provided herein. The present embodiment comprises an LED source 1130 which is incident on two detectors 1110, 1120 each with different filter coatings disposed on substrate 1140.

A filter is designed to measure absorption of the gas as shown in FIG. 3 and placed in front of one of the detectors, e.g., 1110. While the other detector 1120 simultaneously monitors the LED's intensity which may have a different optical filter or none at all. This second detector acts like a "reference channel" and allows one to cancel the variation in the LED or common variations arising from temperature etc. to provide a better measure of the absorption.

More importantly, the cavity design supports multiple simultaneous measurements in the compact geometry.

In some embodiments, detector cover and optical chamber high conductivity (mirrored) or any other suitable material, e.g., metal, semi-metallic, composite, are also not beyond the scope of the present disclosure. In embodiments, the cover can be made of a polymer and silvered using deposition techniques known in the art.

In some embodiments, photodetector is a sensor of light or other electromagnetic energy. Photodetector has p-n junctions that converts light photons into current. The absorbed photons make electron-hole pairs in the depletion region, which is used to detect received light intensity. In some embodiments, photodetector are photodiodes or phototransistors. However, any light detecting means, e.g., avalanche, photo-multiplier tube, etc. is not beyond the scope of the present disclosure.

In some embodiments, the opto-isolating structural is made from a material that absorbs the light in its bulk.

Furthermore, the elements are smooth and have mirror like finish instead of matte finish. A bulk absorption material is such that absorption depth >10's of wavelengths of light. Thus, the real part of refractive index remains very close to the same as the non-absorbing material.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor but may be distributed in a modular fashion among a number of different computers or processors to implement various aspects of the present application.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. An opto-electronic package for measuring absorption of light by a gas comprising:
   a substrate;
   a light source disposed on the substrate;
   a first light filter;
   a first detector disposed on the substrate; and,
   a cap having a first surface and defining a cavity for measuring absorption of light by a gas, the cap configured to mechanically couple with the substrate and cover the light source and first detector;
   wherein, the first surface of the cap forms at least two three-dimensional conic section shaped reflective surfaces.

2. The opto-electronic package for measuring absorption of light by a gas of claim 1, wherein the three-dimensional conic section shaped reflective surfaces are ellipsoidal mirrors.

3. The opto-electronic package for measuring absorption of light by a gas of claim 2, wherein the ellipsoidal mirrors are inclined substantially at 45 degrees to provide high collection of the light source to the first detector.

4. The opto-electronic package for measuring absorption of light by a gas of claim 1, wherein the cap provides for openings for a diffusion of gas molecules.

5. The opto-electronic package for measuring absorption of light by a gas of claim 1, wherein the substrate and the cap provides a method of alignment to each other.

6. The opto-electronic package for measuring absorption of light by a gas of claim 1 further comprising a second detector.

7. The opto-electronic package for measuring absorption of light by a gas of claim 6, wherein the first detector acts as a reference detector that measures light such that its signal is substantially insensitive to the absorption by a predetermined gas.

8. The opto-electronic package for measuring absorption of light by a gas of claim 7, wherein the second detector acts have an optical filter attached to it or provided on top of it to make it substantially sensitive to the absorption by the predetermined gas.

9. The opto-electronic package for measuring absorption of light by a gas of claim 1, wherein the light source is an LED.

10. The opto-electronic package for measuring absorption of light by a gas of claim 9, wherein the LED has a center wavelength from between 0.2-12 µm.

11. The opto-electronic package for measuring absorption of light by a gas of claim 1, wherein the light source is a thermal light source.

12. A method of manufacturing an opto-electronic package for measuring absorption of light in gas detection, the method comprising:
   providing a substrate;
   disposing a light source on the substrate;
   disposing a first light filter in close proximity to the light source;
   disposing a first detector on the substrate;
   mechanically coupling a cap by covering the substrate which defines a cavity for measuring the of absorption of gas, the cap comprising at least two three-dimensional conic section shaped reflective surfaces; and,
   providing a blocking element on the substrate by disposing a septum between the light source and first detector, the blocking element extending across a width of the cavity.

13. The method of manufacturing an opto-electronic package for measuring absorption of light in gas detection of claim 12, the method further comprising illuminating the cavity with the light source.

14. The method of manufacturing an opto-electronic package for measuring absorption of light in gas detection of claim 13, detecting the illuminated light using direct photon absorption.

15. The method of manufacturing an opto-electronic package for measuring absorption of light in gas detection of claim 14, wherein direct photon detectors comprise at least one of PbSe, PbS, HgCdTe, GaSb/InAs and, superlattice.

16. The method of manufacturing an opto-electronic package for measuring absorption of light in gas detection of claim 13, the method further comprising detecting the illuminated light using an indirect method of measurement that includes conversion to heat to measure light flux.

17. The method of manufacturing an opto-electronic package for measuring absorption of light in gas detection of claim 16, wherein the indirect thermal detector comprises at least on of pyroelectrics and bolometers.

18. The method of manufacturing an opto-electronic package for measuring absorption of light in gas detection of claim 12, the method further comprising detecting a plurality of gases based at least on absorption.

19. The method of manufacturing an opto-electronic package for measuring absorption of light in gas detection of claim 12, the method further comprising providing gas inlets in the cap.

20. An opto-electronic system for measuring absorption of light by a gas comprising:
means for providing a substrate;
means for disposing a light source on the substrate;
means for disposing a first light filter in close proximity to the light source;
means for disposing a first detector on the substrate;
means for providing a blocking element on the substrate by disposing a septum between the light source and first detector; and,
means for mechanically coupling a cap by covering the substrate which defines a cavity for measuring the of absorption of gas, the cap comprising at least two three-dimensional conic section shaped reflective surfaces.

21. The opto-electronic package of for measuring absorption of light by a gas of claim 1, wherein the three-dimensional conic section shaped reflective surfaces are paraboloidal mirrors.

22. The opto-electronic package of for measuring absorption of light by a gas of claim 1, further comprising a septum disposed between the light source and first detector on the substrate and extending across a width of the cavity, the septum configured to block light from a direct path between the light source and first detector.

23. The opto-electronic package of for measuring absorption of light by a gas of claim 1, wherein a total optical path from the light source and first detector is less than 34 mm.

24. The method of manufacturing an opto-electronic package for measuring absorption of light in gas detection of claim 12, wherein the three-dimensional conic section shaped reflective surfaces are ellipsoidal mirrors.

25. The method of manufacturing an opto-electronic package for measuring absorption of light in gas detection of claim 12, wherein the three-dimensional conic section shaped reflective surfaces are paraboloidal mirrors.

26. The method of manufacturing an opto-electronic package for measuring absorption of light in gas detection of claim 12, wherein a total optical path from the light source and first detector is less than 34 mm.

27. The opto-electronic package for measuring absorption of light by a gas of claim 7 further comprising a septum disposed between the first and second detector such that the first detector has a direct light path from the light source, whereas the second detector does not as it is blocked by the septum.

28. The method of manufacturing an opto-electronic package for measuring absorption of light in gas detection of claim 12 further comprising disposing a second light detector on other side of the septum such that it has a direct light path from the light source.

* * * * *